Jan. 24, 1956    G. W. WRIGHT ET AL    2,732,103
LIQUID FUEL DISPENSING APPARATUS
Filed Sept. 26, 1950    5 Sheets-Sheet 1
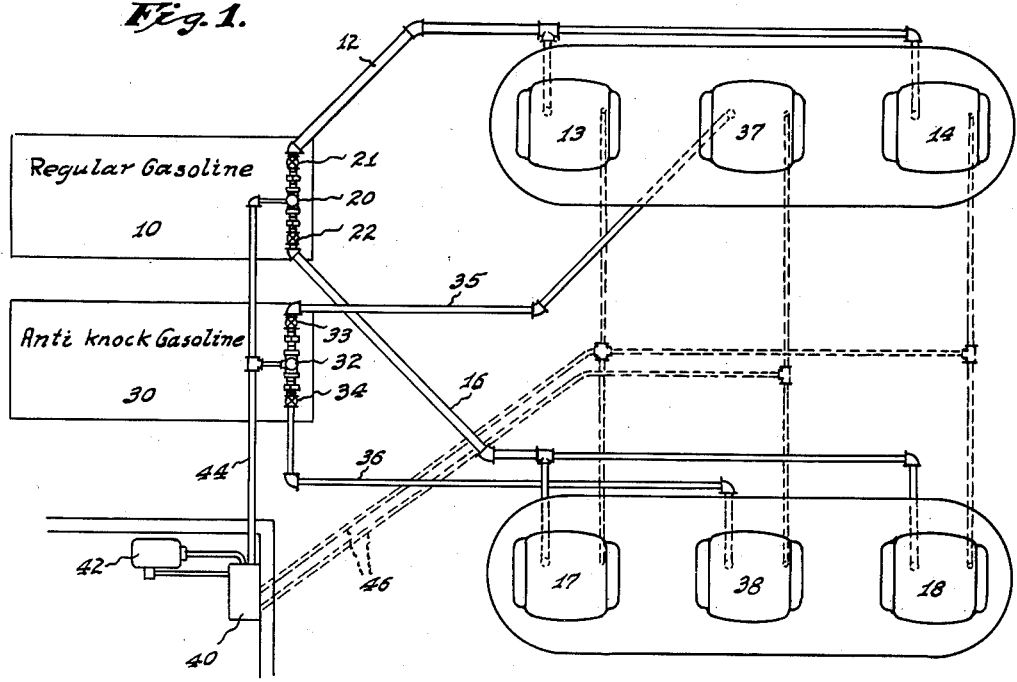
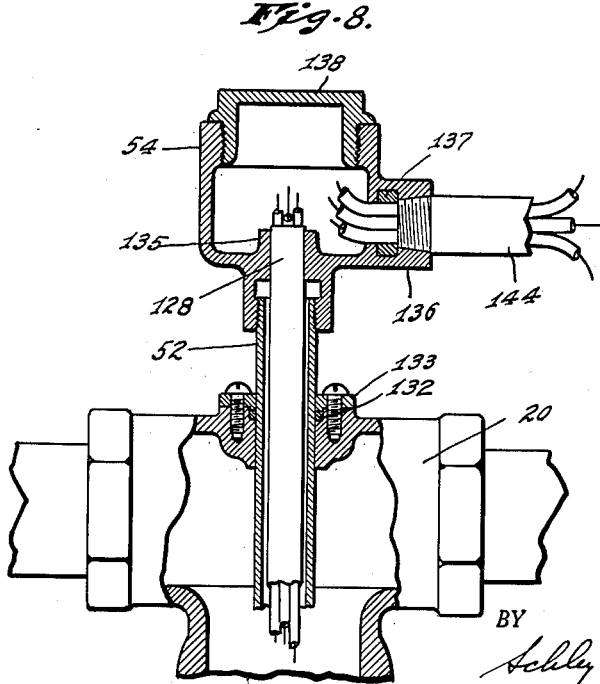
INVENTORS
GEORGE W. WRIGHT,
ROBERT J. JAUCH,
JOSEPH D. CLYMER,
ERNEST E. JACKSON and
OTTO R. SCHEURER.
BY
Schley, Frank & Jenkins
ATTORNEYS.

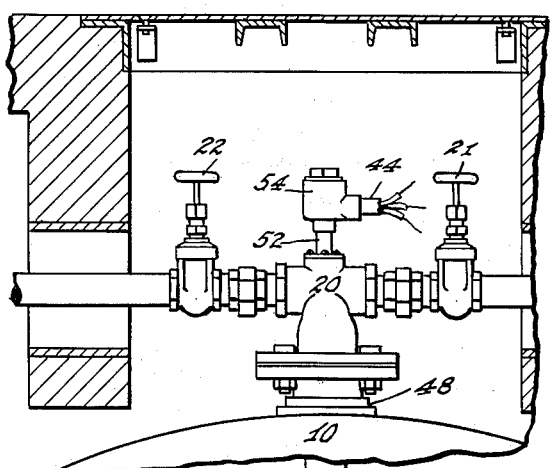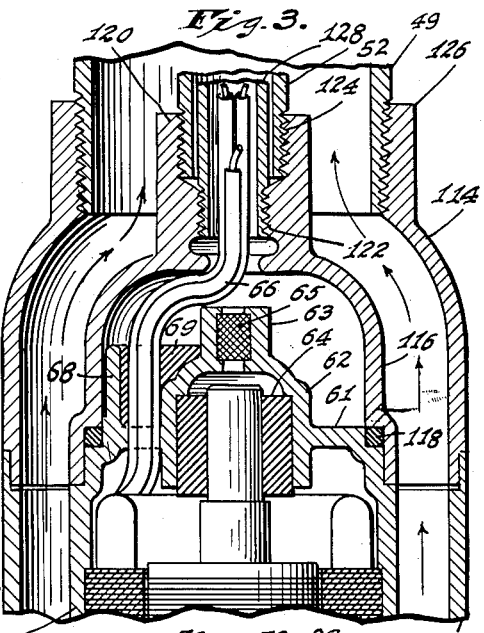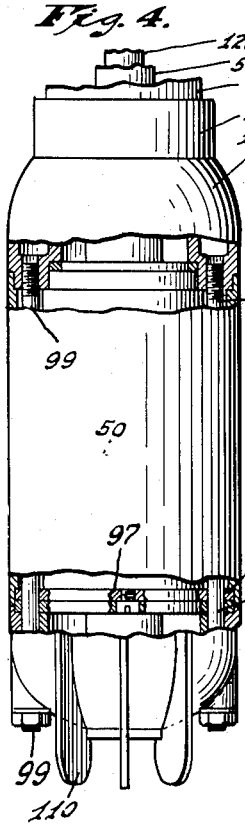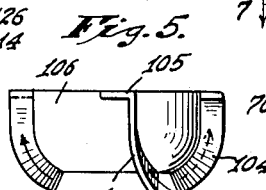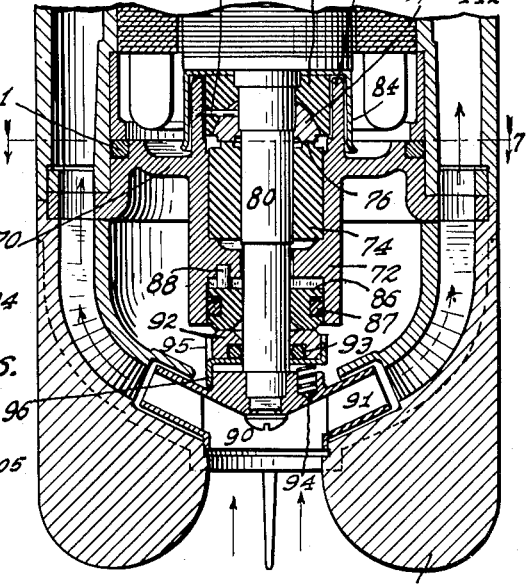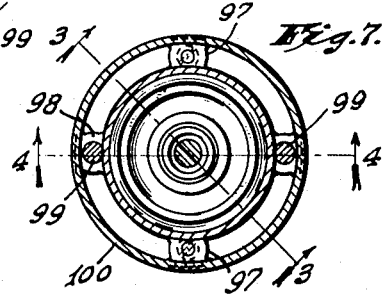

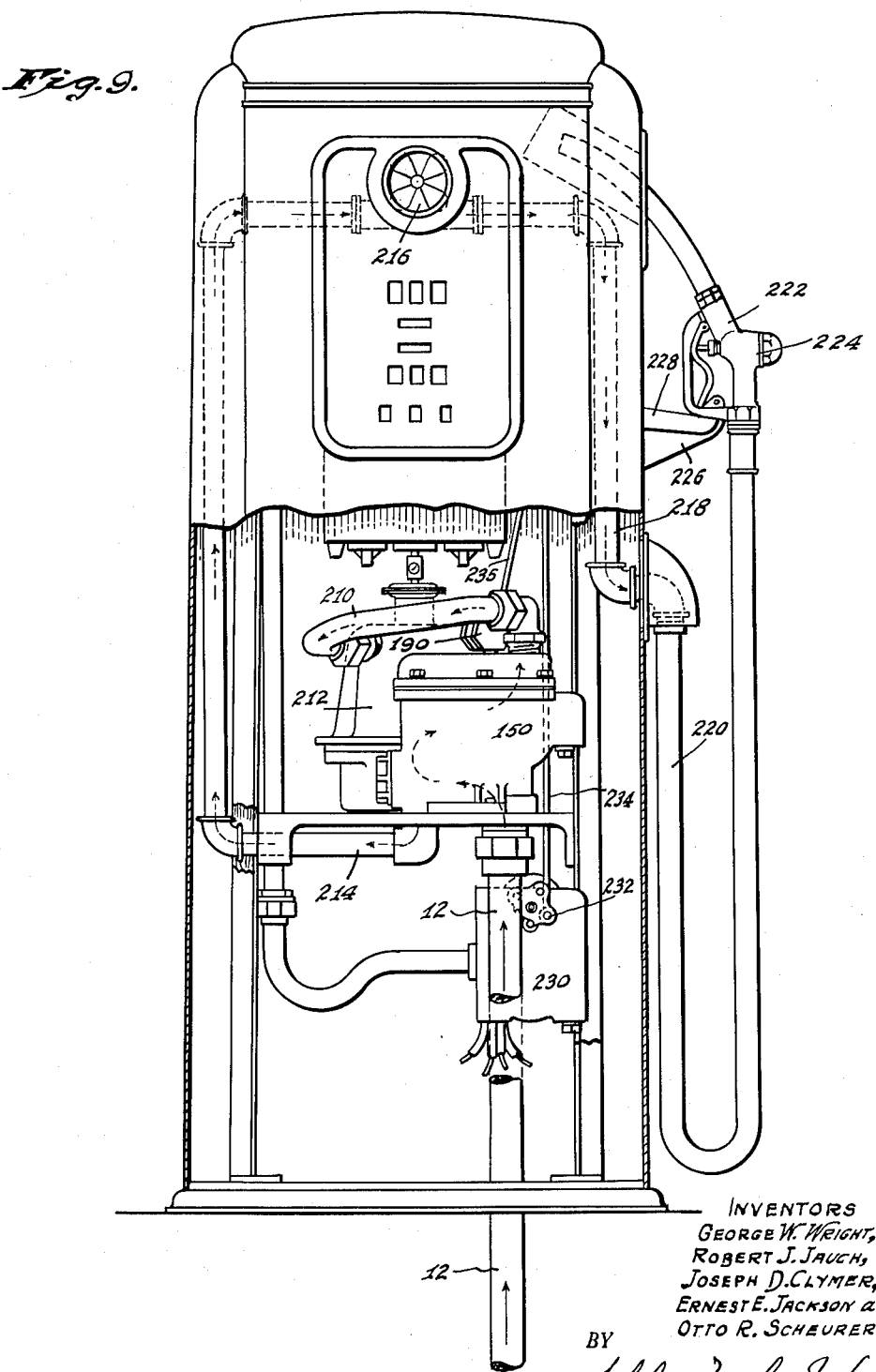

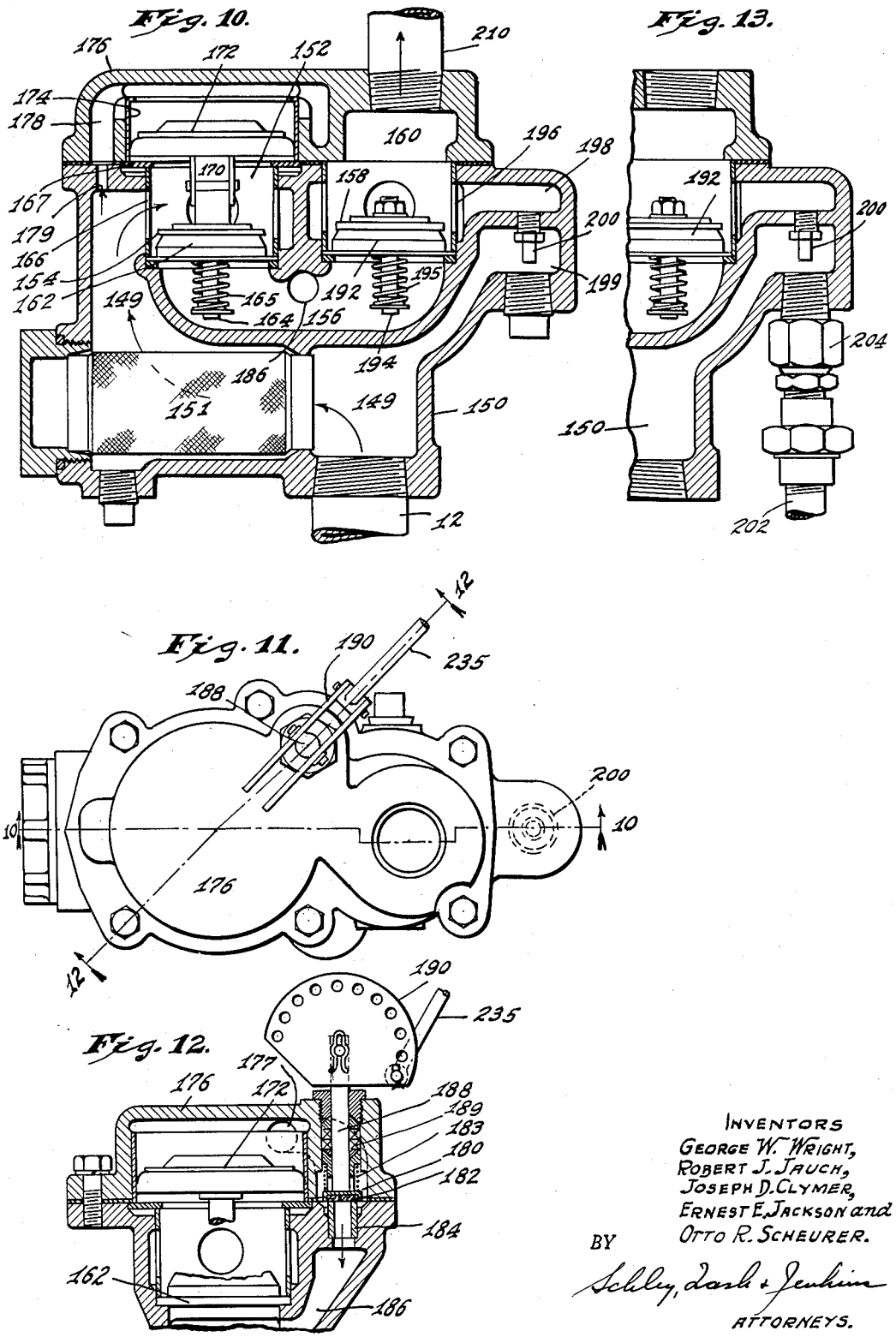

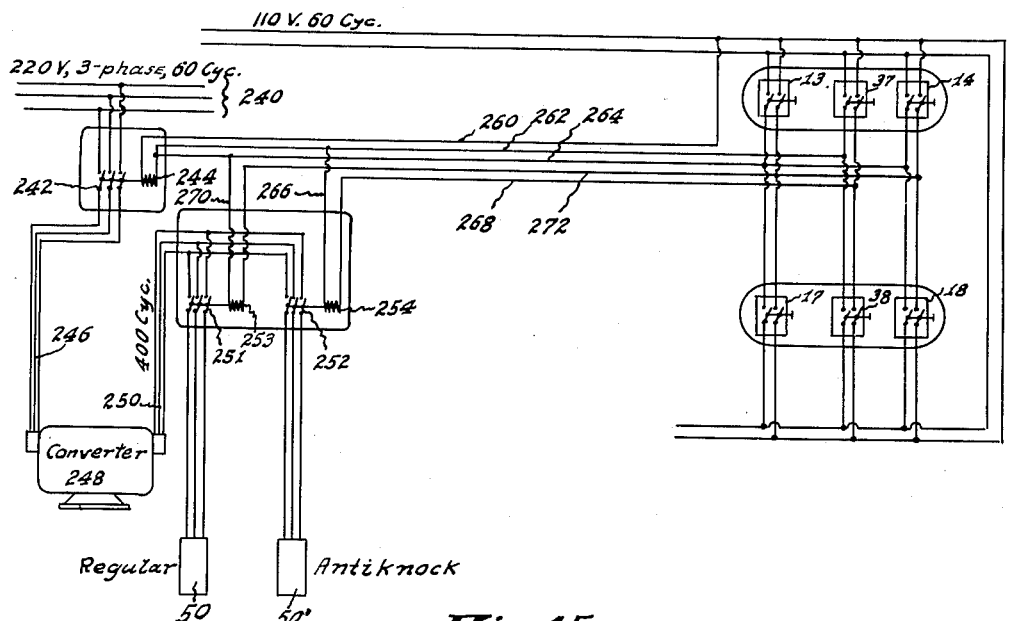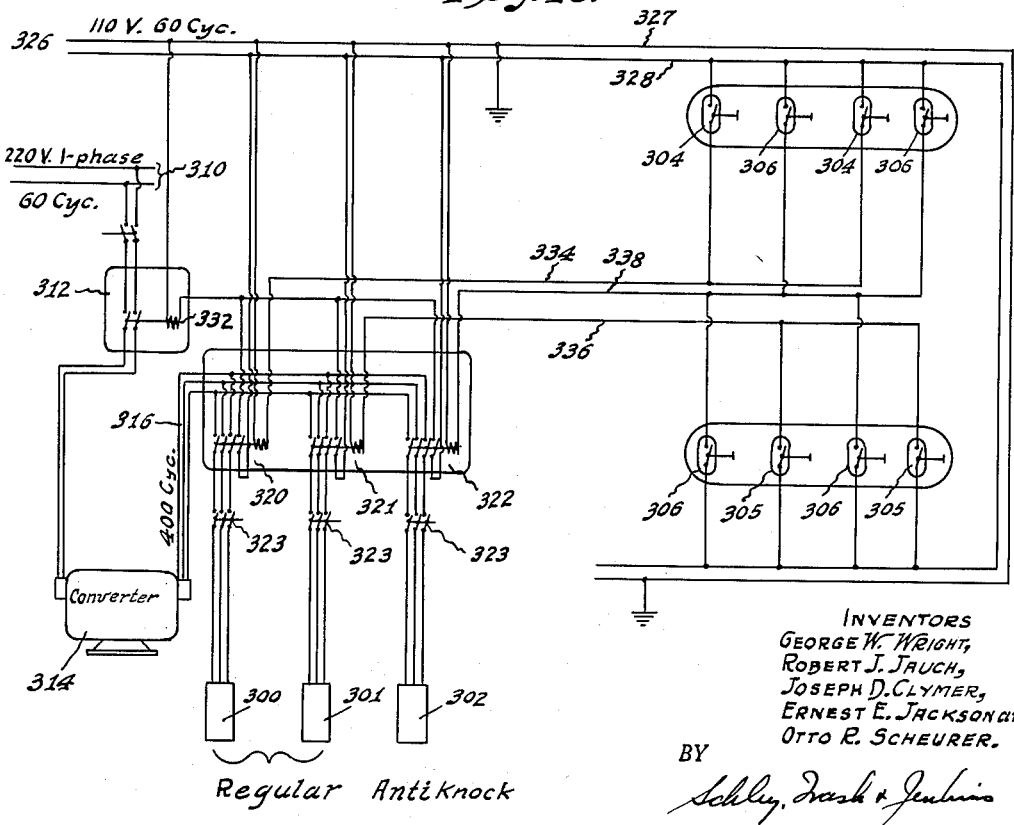

United States Patent Office 2,732,103
Patented Jan. 24, 1956

2,732,103

LIQUID FUEL DISPENSING APPARATUS

George W. Wright, Robert J. Jauch, Joseph D. Clymer, Ernest E. Jackson, and Otto R. Scheurer, Fort Wayne, Ind., assignors to Tokheim Corporation, a corporation of Indiana Application September 26, 1950, Serial No. 186,815

12 Claims. (Cl. 222—330)

This invention relates to a dispensing system for liquid fuel, such as gasoline, in which the fuel pump is submerged in the fuel in a supply tank and the fuel is delivered to the dispensing stand under pressure.

In the usual gasoline service station installation, the gasoline is drawn from an underground storage tank by suction through a suction pipe to a pump in a dispensing stand mounted above ground. That suction system presents a number of difficulties in handling modern high-test gasolines, and such difficulties can be expected to worsen as new and more highly volatile gasolines come into use. Under the suction head, the highly volatile gasolines vaporize and boil in the suction pipe, especially under high temperature conditions. Vapor locks form in the system, to interfere with proper operation. The boiling of the gasoline tends to fractionate it, and the light fractions remain in gaseous form as the mixture passes through the pump to the dispensing line. Such vaporized light-ends must be eliminated by venting them to the atmosphere through an air separator. The gasoline delivered under these circumstances includes only the heavier fractions of the gasoline, and the light fractions are wasted. In such a system, it is essential to have an air separator, to insure metering and delivery only of liquid gasoline and to prevent vaporized gas from passing through the meter and the dispensing line. Moreover, such systems require a pump at each dispensing stand, and for high efficiency of gasoline delivery, the pumps used are positive displacement pumps made with extreme accuracy, and with them the system requires a by-pass circuit to take account of normal variations and interruptions of delivery flow.

It is a primary object of this invention to provide a practical system for handling gasoline under pressure, in which a pump is mounted submerged in the gasoline storage tank so that the gasoline feeds to the pump under the static head of gasoline in the storage supply and is conveyed to the dispensing stand under pump delivery pressure. It is an object of the invention to provide such a system in which the pump is an impeller pump, providing the characteristic advantages of such a pump; for such a pump will maintain proper dispensing pressure under varying conditions of delivery flow, while the energy it uses will be generally proportional to the delivery flow, with little or no energy wasted, as in pumping gasoline through a by-pass circuit. It is an object of the invention to provide a practical system in which a plurality of dispensing stands are supplied from a single pump in a common supply tank, and in which such stands may be operated either separately or simultaneously at full capacity and without loss of efficiency. It is an object of the invention to interrelate a plurality of multiple dispensing stand systems for operation from a common source of power, with such power source connected only when one of the dispensing stands is in use. It is an object of the invention to provide a dispensing system in which the pump and motor are assembled as a unit and mounted in submerged position in a supply tank; and especially to provide a motor and pump unit which is of such small physical size that it can be mounted in submerged position in a standard storage tank through the relatively small standard outlet opening of such a standard tank, and thus to permit the use of standard tanks in the system, and to permit the system to be installed at stations in which the tanks are already in place. It is an object of the invention to provide a single-pump, multiple-stand system in which the dispensing stands are provided with controls operable in the usual and familiar way, so that the general public and the operator will be confronted with no unfamiliar mechanism. It is an object of the invention to provide such a system in which each dispensing stand may be connected to the supply tank by a single pipe and in which all of the plurality of pumps are maintained ready for use, with each unaffected by the use of any other. It is an object of the invention to provide a gasoline dispensing system which eliminates the necessity for air and gas separation mechanism and for a pump by-pass circuit. It is an object of the invention to provide such a system which is both effective and safe for use with highly volatile gasolines, and to this end, to provide adequate separation between the gasoline circuit and the electrical circuit and to prevent the accumulation of dangerous explosive mixtures.

In accordance with the invention, a motor and pump assembly is mounted as a unit in submerged position in a fuel supply tank, the pump is connected to deliver to one or a plurality of dispensing stands, each equipped with control mechanism. The pump is an impeller pump, which may be a single- or a multi-stage pump, and is preferably compact and of small physical size. The pump is assembled in unitary relationship with the motor, preferably by direct connection thereto—with the pump rotor mounted on and carried by the motor shaft.

The motor is preferably an induction motor, having no brush or commutator parts likely to spark, and with a single-stage impeller pump, the motor may be a high-speed motor operable on high cycle current of the order of 400-cycles per second. The pump is an impeller pump, desirably direct-connected to the motor. The pump delivery passages are preferably formed about the motor, concentric therewith and in cooling relation therewith. The motor and pump form a compact generally-cylindrical unit of small physical size and especially of small diameter. The fuel delivery passageways of that compact unit desirably terminate in a pipe fitting opening axially of the unit, for connection to a delivery pipe extending generally axially from the motor and by which the motor and pump unit may be physically supported. The interior of the motor is formed to contain a minimum free space, and such space is desirably in communication, preferably through a flame barrier, with an expansion-relief conduit. Such expansion-relief conduit desirably serves also as an electrical-supply conduit, and is effectively separated and sealed from the fuel circuit. Preferably, the expansion-relief and electrical conduit extends axially through the supporting fuel-delivery pipe.

Such compact motor and pump unit, of small physical size and of small diameter, mounted on a supporting delivery pipe, is installed through the standard outlet opening of a standard storage tank, in a depending position with the pump inlet a few inches from the bottom of the storage tank, where fuel will flow to it under the static head in the tank. Such a pump unit assembly is found capable of a delivery rate sufficient for a plurality of gasoline dispensing stands, for example six of such stands, and the several stands may be connected in parallel by a single-pipe system to the delivery pipe from the tank.

The motors in a plurality of supply tanks, as to supply "regular" and "antiknock" gasolines, are connected to a suitable current supply, which with high-cycle motors may be a cycle-changer or converter connected to a usual 60-cycle line. Each motor circuit, and the converter circuit if a converter is used, desirably includes a cross-line switch responsive to a control circuit operable on any desired current, conveniently the standard 115-volt 60-cycle current. The control circuit extends to each of the several dispensing stands of the system, and each such stand is provided with a control switch which may be closed to close the operating circuits.

The motor and pump unit may be employed in any of a number of liquid fuel dispensing systems, for example in a commercial dispensing system. It is especially adapted for use in a retail dispensing system as in a usual gasoline service station installation. Such an installation may include a plurality of tanks, and a plurality of dispensing stands connected to each. In such a retail system embodying this invention, each dispensing stand may include a control switch, and a dispensing line comprising valve mechanism, a meter and computer, a visible flow gauge, and a dispensing hose terminating in a nozzle containing a control valve, usually a manually operated control valve. The valve mechanism of the dispensing line includes a check-type valve which is normally closed against flow, a control for opening such valve, flow-regulating means, and a check-valve to maintain the line full of gasoline. Preferably, the valve-mechanism used in the dispensing stand is that shown in copending application Serial No. 236,134, filed July 11, 1951, in which the check-type valve and the flow-regulating means are combined. The valve control is desirably interconnected with the control switch for common operation, as from an interlock member interrelated with the computer.

The accompanying drawings illustrate the invention. In such drawings, Fig. 1 is a diagrammatic plan of a service station system having two gasoline storage tanks, as for regular antiknock gasolines, and having two service islands each containing three dispensing stands, with two stands on each island connected to the regular-gasoline storage tank and one connected to the antiknock-gasoline storage tank; Fig. 2 is a fragmental vertical section of a tank installation, showing a motor and pump unit in the tank and showing the delivery pipe header and electrical junction box located in a service pit; Fig. 3 is an axial section of the motor and pump unit shown in Fig. 2, taken on the line 3—3 of Fig. 7; Fig. 4 is a side elevation of the motor and pump unit of Fig. 3, with parts broken away to show details of its assembly in a section taken on the line 4—4 of Fig. 7; Figs. 5 and 6 are respectively side and top elevations of the diffuser cup used in the structure of Fig. 3; Fig. 7 is a horizontal section of the pump along line 7—7 of Fig. 3; Fig. 8 is a vertical section of the electrical junction box (and expansion-relief chamber) connected to the motor and pump unit in Fig. 2; Fig. 9 is a side elevation of a dispensing stand, with the casing broken away to show the dispensing stand mechanism; Fig. 10 is a vertical section taken on the line 10—10 of Fig. 11, showing the preferred valve assembly of the dispensing stand; Fig. 11 is a top plan of the valve assembly shown in Fig. 10; Fig. 12 is a vertical section taken on the line 12—12 of Fig. 11; Fig. 13 is a fragmental section taken in the same plane as Fig. 10 and showing an alternative construction adapted for use when the gasoline delivery line contains a check valve and providing a pressure-relief return line to the tank, which by-passes such check valve; Fig. 14 is an electrical diagram showing an electrical system in which the pump motors are high-cycle motors and in which a converter supplying high-cycle current to the pumps is connected to a 220 volt, 3-phase, 60-cycle supply circuit and in which the control circuit employs two-pole switches in the dispensing stands; and Fig. 15 is an electrical diagram showing an electrical system in which the converter is connected to a 220 volt, 1-phase, 60-cycle supply circuit and in which the control circuit employs single-pole switches in the dispensing stands.

In the representative service station plan of Fig. 1, "regular" gasoline is stored in a storage tank 10, and this is connected by a delivery pipe 12 to dispensing stands 13 and 14 at the ends of the upper service island, and by a delivery pipe 16 to the two dispensing stands 17 and 18 on the lower service island. Such delivery pipes 12 and 16 are desirably connected to the pump unit header 20 through valves 21 and 22. Antiknock gasoline is stored in the storage tank 30, and its pump header 32 is connected through valves 33 and 34, by supply pipes 35 and 36 to the middle dispensing stands 37 and 38 on the two service islands. Electrical motor-service lines and control-service lines are brought into the master switch and junction panel 40, the motor supply line is connected to the converter 42 to produce high-cycle motor operating current, and this is supplied to the pump headers 20 and 32 through a supply conduit 44. Control and lighting circuits are carried to the several dispensing stands through electrical conduits 46 shown in dotted lines.

The two pump headers 20 and 32 are alike, and are desirably located in suitable service pits as shown in Fig. 2. As there shown, the supply header 20 is generally in the form of a pipe T carried by a flange mounted on the outlet fitting 48 of the tank 10. The header 20 carries a delivery pipe 49 which supports the motor and pump unit 50 and receives gasoline therefrom. The top wall of the header 20 is provided with a central opening to pass the electrical supply tube 52, which supports a junction box 54 connected to the supply conduit 44 and which also serves as an expansion-relief chamber as will be noted below.

Within the motor and pump unit 50 shown in Fig. 3, the motor is enclosed in a cylindrical motor housing 60 closed at its upper end by an integral wall 61 which supports a central sleeve 62 containing the upper bearing 64 for the motor shaft. The supply wires 66 for the motor pass through the wall 61 and through a pocket formed between an upstanding wall 68 and the bearing sleeve 62, and such wires are sealed in such pocket by filling it with sealing compound 69. The top wall of the bearing sleeve 62 is provided with a boss 63, bored to form an expansion relief passage, and this is closed by a flame barrier 65, as of sponge metal.

The lower end of the motor housing 60 is closed by an end plate 70 having a peripheral wall which is telescopically received within the open end of the cylindrical housing 60, and the two parts are sealed together by an annular gasket 71 which is compressed into sealing relationship with the parts as they are assembled. The end plate 70 supports a central sleeve 72 in which the lower bearing 74 for the motor shaft is mounted. Such bearing 74 carries a radial load from the motor shaft 80, and in addition, its upper end is formed to provide a narrow annular thrust bearing land 76, engaged in thrust relationship by the flat face of a hemisperical thrust bearing 77. Such hemispherical thrust member 77 is carried in a socket member 78 having a hemispherical seat and fixed on the motor shaft 80. The hemispherical member 77 has limited freedom of movement in its socket, but is prevented from rotation with respect to the shaft by a locating pin 79.

The two bearings 64 and 74, and the socket member 78 are desirably made of a carbon bearing-material requiring no periodic lubrication, and the shaft 80 and the hemispherical thrust bearing 77 are desirably made of stainless steel.

The upper end of the bearing-receiving sleeve 72 projects upward as a free-standing rim 82 for a considerable distance, and surrounds the thrust bearing socket 78. An inverted cup 84 is carried by the rotor with its walls positioned to form a depending skirt outside the upstanding rim 82, the interfitting assembly forming a flame barrier between the interior of the motor and the bearing.

The shaft 80 projects through an opening in the end wall of the bearing sleeve 72, and the pump impeller 90 is fixed directly on its lower end. Relative rotation of the two is conveniently prevented by providing the end of the shaft 80 with a squared shank and receiving such shank in a squared opening in the hub of the impeller 90.

The lower end of the bearing sleeve 72 forms an annular socket about the shaft 80 for the reception of a stationary sealing member 86. This has a running fit with the shaft 80, and is sealed to the depending rim of the sleeve 72, as by a resilient annular gasket 87. A diametrical slot in the upper surface of the sealing member 86 engages a fixed pilot pin 88 to prevent rotation of the sealing member 86.

The lower surface of the sealing member 86 forms an annular sealing land, and this is engaged by a corresponding land on a rotary sealing member 92. This is sealed to the shaft, as by a resilient annular gasket 93, and is spring pressed upwardly along the shaft, as by a plurality of circumferentially spaced springs 94 carried in suitable sockets in the hub of the impeller 90. The rotary sealing member 92 is non-rotatably fixed in a cup 95 from which one or more ears 96 are bent downwardly into engagement with a notch in the hub of the impeller 90, to insure rotation of the rotary sealing member 92 with the shaft 80.

The motor housing 60 and the end plate 70 are secured together to form a self-contained motor unit. To this end, the lower end of the housing 60 is provided with a pair of diametrically opposite ears 97 overlying corresponding ears on the end plate 70, and the two parts are secured together by screws passed through the associated ears. Each of the parts also carries a second pair of ears 98 spaced 90° from the first, and bored to receive a pair of bolts 99 by which the pump and motor assembly is secured together. The four ears on each of such members desirably support a peripheral locating ring 100.

The impeller 90 here shown is of the enclosed type, and generally conical in form with its open eye at the apex of its cone, so that flow through it is mixed-flow, with both radial and axial components of movement. It is provided with impeller blades 91 extending spirally from its eye to its periphery. The impeller thus discharges in a generally radial direction with considerable upward component, and the circle at which it discharges is smaller than the circumference of the motor housing 60.

The discharge from the impeller 90 is received by a diffuser formed by diffuser vanes 104 carried on the exterior of a diffuser cup 106. Conveniently, there are four such diffuser vanes 104, and each terminates at its upper end in an ear 105 positioned to underlie the ears 97 and 98, and two opposite ones of such ears 105 are bored to pass the assembly bolts 99. The diffuser cup lies between the end surface of the end plate 70 and the inner surface of the pump shroud 110 of the pump assembly, and such inner surface forms the outer walls of the diffuser passages. Desirably the pump shroud 110 is provided with a circumferentially spaced series of radial vanes to prevent swirl of gasoline entering the eye of the impeller 90. The diffuser overcomes the swirl in the gasoline discharged from the rotor, and guides the flow in a smoothly curved path terminating generally axially of the assembly.

From the diffuser, the gasoline flows upwardly in an annular passage formed between the motor housing 60 and a casing sleeve 112, and passes from that passage into the upper cap 114 of the assembly. Such upper cap has an inner cup-shaped wall 116 telescopically received over the motor housing 60 and sealed thereto by an annular gasket 118. The upper end of such inner wall 116 carries an upstanding boss 120 which is bored and counterbored and provided with two sets of concentric threads 122 and 124. The outer wall of the cap 114 is aligned at its lower end with the sleeve 112, and terminates at its upper end in a hub 126 threaded to receive and to be supported on the deliverey pipe 49.

The sleeve 112 is suitably shouldered to lap the cap 114 and the locating rings 100; and the diffuser 106, the shroud 110, the sleeve 112, and the cap 114 are held in assembled relation by the pair of stud bolts 99 threaded into suitable bosses between the inner and outer walls of the cap 114 and extending downwardly between the motor housing 60 and the sleeve 112, through the ears 98 and 105, and through the shroud 110, as shown in Fig. 4.

In mounting the motor and pump assembly for use, the hub 126 is threaded onto the supporting delivery pipe 49, a tube 128 is threaded into the threads 122 to receive the supply wires 66 for the motor, and a supporting and protecting tube 52 of larger diameter than the tube 128 is threaded into the threads 124 of the central boss 120. The pipe 49 and the two tubes 128 and 130 extend upwardly to the pump header 20, and the upper end of the pipe 49 is threaded into the main body of the header 20. The two inner tubes 128 and 52 extend on upward through the header 20 and through the opening in its top wall. The outer tube 52 is sealed to the header 20, as by an annular gasket 132 lying in a groove in the header 20 and compressed into sealing engagement with the parts by a ring 133. The two tubes 128 and 130 are connected at their upper ends to the junction box 54. The outer tube 52 is threaded to the bottom boss 134 of the junction box 54 and provides the main support therefor. The inner tube 128 extends on upward into the junction box 54 through a collar 135 in which it has a slip fit. The supply conduit 44 is connected to a side boss 136 on the junction box 54, and at such connection, the box 54 is sealed with a suitable sealing packing 137. The top of the junction box 54 is closed by a cap 138.

In this assembly there are a number of separate compartments. The motor is contained in a compartment formed by its housing 60 and its end plate 70, which is completely closed and sealed at its lower end, and is open at its upper end only through the restricted expansion-relief opening containing the flame barrier 65. Its opening through that flame barrier 65 communicates with a second compartment defined by the inner wall 116 of the cap 114, and this compartment is completely closed and sealed at its lower end. It communicates through the interior of the tube 128 with the junction box 54, and such junction box is sealed. The inner tube 128 is protected by the concentric tube 130, which provides a secondary closure separating the electrical-supply and expansion-relief circuit from the gasoline circuit. The motor is thus completely enclosed save for expansion-relief communication with a closed electric-supply passageway, which terminates at its upper end in a completely closed junction box of a size which provides an expansion chamber of relatively large volume. The motor compartment contains very little free space—substantially less than the expansion chamber—and may be filled either with air or with some inert gas, such as nitrogen. The motor is cooled by the flow past its walls of gasoline from the underground storage supply, and expansion of the small amount of gas contained in the motor compartment from any heat of operation is minimized by such cooling; and in any event such minimized expansion is dissipated by expansion-relief communication with the relatively large-volume expansion chamber in the junction box 54, located outside the gasoline storage tank.

The motor and pump unit described above is of small physical size and especially of small diameter, for ready insertion through the standard outlet opening of a standard tank. In an actual installation, the motor was an induction motor nominally rated at ¾ horsepower (but actually about 1-horsepower), having a synchronous speed on 400-cycle current of 12,000 revolutions per minute, and the combined motor and pump unit had an overall diameter of 3½ inches and an over-all length of about 10½ inches, with other parts in proportion as shown in Fig. 3. Such unit delivered up to 45 gallons of gasoline per minute under a delivery head of 15 lbs. per square inch.

In a service station installation, the supporting delivery pipe 49 and the supply pipes 12 and 16 from the pump header 20 to the dispensing stands are desirably open, and contain no check valve. In the dispensing stand, that open supply circuit is connected directly to a valve housing 150 such as that shown in Figs. 10 to 12. In that housing, the gasoline first enters a screen chamber 149 and passes through a removable cylindrical screen 151. From the screen, it passes to a regulating valve chamber 152, thence through the regulating valve 154 to a transfer passage 156, and thence upwardly through a check valve 158 to an outlet chamber 160.

The regulating valve comprises a check-type valve disk 154 closing downwardly against a seat formed at the upper rim of a carrier 162 having a flange at its lower end. The valve 154 has a depending stem 164 surrounded by a spring 165 to yieldingly urge the valve to closed position. The carrier 162 rests on an annular gasket, and is held in sealing engagement therewith by a spacer 166, held in place by a retaining ring 167. The upper end of the valve 154 is connected to the stem 170 of a piston assembly 172 in a cylinder 174 formed in the cap 176 of the valve body 150. The compartment at the upper end of the cylinder 174 communicates through a branch passage 178 with the screen chamber 149, by way of a restricted opening 179.

The compartment at the upper end of the cylinder 174 also communicates through a branch passage 177 (shown in dotted lines in Fig. 12) with a pilot valve chamber 180. Such chamber 180 contains a pilot valve 182 spring pressed downward by a spring 183 against a sleeve 184 forming a valve seat at its upper end and communicating at its lower end with a branch passage 186 leading to the transfer passage 156. The stem 188 of the pilot valve 182 extends upward through a packing gland 189 to a point above the cap 176 of the valve body. The upper end of that stem 188 carries a pair of cam plates 190 which may be rotated through a camming movement to lift the pilot valve 182 from its seat. Operation of this regulating valve will be described below.

The check valve 158 is in the form of a disk seated on the upstanding rim of a carrier 192, and has a depending stem 194 surrounded by a spring 195 which yieldingly urges the check valve to closed position. The check valve carrier 192 rests on a gasket and is held in place by a spacer 196 lying in abutment with the cap 176.

The outlet chamber 160 has a branch passage 198 overlying a branch passage 199 of the screen chamber 149, and the dividing wall between these two branch passages carries a pressure-relief valve 200 opening in the direction of the screen chamber 149 and by-passing the check-valve 158.

Where the valve assembly is to be installed in a system in which the supply pipe contains a check valve, a return bleed line 202 is desirably provided, as shown in Fig. 13. This is conveniently connected in alignment with the bleed valve 200, and is connected through a fitting 204 which contains a similar bleed valve opening in the direction of a bleed line 202. Such bleed line 202 is connected to the supply system at a point below its check valve, preferably direct to the supply tank.

From the outlet chamber 160, the valve assembly is connected by a pipe 210 in the dispensing stand to a meter 212, which may be of any desired standard construction. Metered flow from the meter 212 passes downwardly from the meter to a pipe 214 leading to the visible flow gauge 216 at the top of the stand, and thence through a pipe 218 to the dispensing hose 220. The hose is carried by the dispensing stand in any desired manner, here shown as an outside depending loop. At the free end of the hose 220, it carries a nozzle 222 provided with a control valve 224, shown as for manual operation.

A nozzle bracket 226 on the dispensing stand supports the nozzle in storage position. Associated with the bracket 226 is an interlock lever 228 which is depressed to inoperative position when the nozzle is hung on the bracket 226 and which may be lifted manually to operative position when the nozzle is removed from the bracket 226.

A junction box 230 in the dispensing stand provides for connection of any desired lighting circuit, and houses a pump-motor control switch operable by a lever 232. The switch lever 232 and the pilot valve cam plates 190 are connected by rods 234 and 235 for actuation by the interlock lever 228 so that lifting of such lever 228 closes the motor switch and moves the pilot valve cam plates to open the pilot valve 182.

The electrical diagram of Fig. 14, like the service station plan of Fig. 1, shows two gasoline storage tanks equipped respectively with gasoline pumps 50 and 50', and includes two service islands carrying dispensing stands numbered as in Fig. 1, but the electrical system shown can, of course, be used with any number of pumps and stands. Pump operating current is drawn from a 220-volt, 3-phase, 60-cycle supply line 240, through wires leading to a cross-line switch 242 with automatic control mechanism 244 indicated diagrammatically as a coil. The switch 244 is connected by wires 246 to a converter 248. The 400-cycle, 3-phase output from the converter is connected by wires 250 to both of two cross-line switches 251 and 252, controlled by automatic controls 253 and 254. The switch 251 is connected to the pump 50 in the regular-gasoline supply tank, and the switch 252 is connected to the pump 50' in the antiknock-gasoline supply tank.

A 110-volt 60-cycle control supply line is connected to one side of a two-pole switch in each of the six dispensing stands (and controlled by the switch lever 232 of each stand), and one side of such control supply line is connected by a wire 260 to the control 244 of the master switch 242 in the converter supply line. The other side of such control 244 is connected by a wire 262 to one pole of the control switches in the antiknock dispensing stands 37 and 38, and by the wire 264 to one pole of the control switches in the regular-gasoline dispensing stands 13, 14, 17 and 18. The control 254 for the antiknock gasoline motor 50' is connected by a branch wire 266 to the wire 262, and the other side of such control 254 is connected by a wire 268 to the other pole of the switches in the antiknock-gasoline dispensing stands 37 and 38. The control 253 for the regular gasoline pump switch 251 is connected by a branch wire 270 to the branch wire 264 and through it to the first pole of each control switch in the regular-gasoline dispensing stands. The other side of such control 253 is connected by a wire 272 to the other pole of each control switch in the regular-gasoline dispensing stands.

The electrical diagram of Fig. 15 shows an alternative wiring arrangement, applied to a system in which there are two regular-gasoline pumps 300 and 301 and one antiknock-gasoline pump 302. The first regular-gasoline pump 300 supplies two dispensing stands 304 of the service island shown at the top of the diagram, the second regular-gasoline pump 301 supplies two regular-gasoline dispensing stands 305 of the island shown at the bottom of the diagram, and the antiknock gasoline pump 302 supplies the four antiknock gasoline stands 306. The motor-operating current is drawn from a 220-volt, one-phase, 60-cycle supply line 310, connected through a master control switch 312 to the converter 314. The 115-volt, 3-phase, 400-cycle output line 316 of the converter is connected to three poles of each of the three 4-pole gang switches 320, 321, and 322. Each of these switches is an automatic switch, operable by control mechanism in the control circuits described below. The fourth pole of each 4-pole gang switch is connected in the control circuits, as will appear. The three switches 320, 321, and 322 control respectively the three motors 300, 301, and 302, desirably through the manual cut-out switches 323.

The control supply circuit 326 supplies 110-volt, 60-cycle current. Its neutral grounded side 327 is connected to the operating mechanism 332 of the master switch 312, and to the operating mechanism of each of the gang switches 320, 321, and 322. The opposite side of the operating mechanism 332 of the master switch 312 is connected to the fourth pole of each of the 4-pole gang switches 320, 321, and 322, and the switch blade of such poles are each connected to the hot side 328 of the control supply line 326. The opposite side of the control mechanism of the gang switch 320 is connected by a wire 334 to the control switch in each of the dispensing stands 304, and the opposite side of each such switch is connected to the hot line 328. The opposite side of the control mechanism of the switch 321 is connected by a wire 336 to the control switches in the dispensing stands 305, and the opposite side of each such switch is connected to the hot line 328. The opposite side of the control mechanism of the gang switch 322 for the antiknock pump 302 is connected by a wire 336 to the control switch in each of the four antiknock dispensing stands 306, and the opposite side of each such switch is connected to the hot line 328.

Upon closing of either of the switches in the regular-gasoline dispensing stands 304, a control circuit is closed through the wire 334, to actuate the gang switch 320 to closed position. As this switch closes, its establishes a circuit through the control mechanism 332 of the master switch 312 to close that switch 312 and start the converter 314. If another dispensing stand switch is closed during the operation of the first dispensing stand, to close another one of the gang switches 321 or 322, this will provide a second path for the circuit of the control mechanism 332 of the master switch 312, to maintain the master switch 312 closed and the converter 314 in operation so long as such control circuit remains closed through either path. The closing of the control switch in any of the dispensing stands will energize the control mechanism of the proper one of the gang switches 320, 321, and 322, to connect the associated pump to the converter output circuit 316, and simultaneously to actuate the switch 312 to closed position if it is not already in closed position by reason of the operation of some other pump.

Operation of the gasoline dispensing system shown in Figs. 1 to 14 of the drawings is as follows:

The nozzle 222 is lifted from its hanger 226 at one of the dispensing stands, say the stand 13, and the operator manually lifts the interlock control lever 228. This closes the control switch in the junction box 230 and simultaneously actuates the cam 190 of the pilot valve 182. The switch closing energizes the converter and energizes the motor of the associated motor-pump unit in the tank 10 connected to the dispensing stand 13 being operated, and operation of such pump creates a pressure in the delivery lines 12 and 16 to the valve housings 150 in the dispensing stands 13, 14, 17, and 18. The operator inserts the nozzle 222 in the fill opening of the purchaser's automobile, and actuates the nozzle valve 224 manually.

In the valve housing 150, the piston 172 of the regulating valve 162 is normally under no pressure differential, for gasoline pressure in the screen chamber 149 exerts itself on the bottom of that piston, through the regulating valve chamber 152, and equally on the top of that piston, through the bleed passage 179 and the branch passage 178. With the piston 172 under no pressure differential, the gasoline pressure on the top of the valve 154 and the influence of the spring 165 maintains the regulating valve 154 in closed position, and it is in effect a check-valve closing in the direction of flow of the dispensing line. Thus, in the dispensing stands 14, 17, and 18 connected the pump 50 in parallel with the stand 13, the regulating valve 154 remains closed and no gasoline or pressure surge escapes past it through the dispensing line of those other dispensing stands.

When the pilot valve 182 is opened in the stand 13, however, the chamber above the piston 172 is connected through that pilot valve and the branch passage 186 to the transfer passage 156, and the valve 154 then becomes a regulating valve. When the associated nozzle valve 224 is opened, this relieves the pressure above the piston 172, and creates a pressure differential on opposite sides of that piston 172, and the piston and valve assembly exert a regulating effect, determined in part by the rates of bleed flow through the bleed opening 179 and the pilot valve seat 184, responsive to and facilitating operation of the nozzle control valve 224. The gasoline now flows under pressure from the screen passage 149 through the transfer passage 156, and the check valve 158 to the outlet pipe 210 from the valve housing. This carries it to the meter 212 where it is metered, and its quantity registered in the computer connected to the meter. From the meter the gasoline flows through the pipe 214, the visible flow gauge 216, and the pipe 218, to the dispensing hose 220 and the nozzle 222.

The rate of delivery through that nozzle may vary widely depending on the manual control of the nozzle valve 224, from no flow to a full delivery flow of 10 to 15 gallons per minute. Delivery at the varying rate is regulated by the regulating valve 154, such valve moving toward closed position as the rate decreases, and vice versa.

When the nozzle valve 224 is shut off, flow stops, and the regulating valve 154 and the check-valve 158 close, but the pump continues to operate to maintain the supply line to the dispensing stand full of gasoline under pressure.

When the nozzle 222 is replaced on its hanger, this depresses the interlock control lever 228, to close the pilot valve 182 and actuate the switch lever 232 to open the control switch. If no other dispensing stand connected to the same pump is then in operation, this opens the pump-motor circuit; and if no other pump connected to the converter is then in operation, it also opens the converter-supply circuit.

This operating cycle leaves the dispensing line of the dispensing stand full of gasoline under pressure. In the event of a temperature rise in that gasoline, it tends to expand, but is prevented from flowing back through the line by the check valve 158. Pressure is relieved, however, through the pressure relief-valve 200 in the valve assembly of the dispensing stand. In a normal service station installation in which the supply line contains no check valve, this pressure relief through the valve 200 is to the screen chamber 149 at which the gasoline enters the valve housing from the supply line, and the small return flow is through that supply line and through the pump. Where the supply line is equipped with a check valve, the pressure relief by-pass line 202 is connected to the valve assembly as shown in Fig. 13, and in this case the pressure relief is through that by-pass line 202.

As has been noted, the rate of gasoline delivery through any one stand will vary widely, from no flow to a full delivery rate of about 10 to 20 gallons per minute. Up to six dispensing stands may be connected to the same pump 50, and three of such stands may be operated simultaneously, so that that pump may be called upon to deliver at widely varying rates ranging from no flow up to maximum delivery flow of about 45 gallons per minute.

In the operation of the pump, gasoline flows to it under the pressure of the static head in the supply tank. Gasoline enters the impeller 90 through its downwardly open eye and flow thereto is guided by the radial vanes on the shroud 110. The impeller rotates at high speed, of the order of 10,000 revolutions per minute, and gasoline is discharged therefrom to the diffuser passages between the vanes 104 of the diffuser cup, where its direction of flow is straightened so that it is delivered generally axially upward to the annular passage surrounding the housing 60 of the motor. From here it flows up through the cap 114 to the supporting delivery pipe 49. At full demand of a plurality of dispensing stands, flow is at the maximum output of the pump, at a rate of about 45 gallons per minute, and the motor is under full load and drawing maximum energy. As the demand varies downwardly, the delivery rate from the centrifugal pump diminishes, with consequent decrease in the load on the motor and a decrease in the energy consumed by that motor. Under conditions of no flow with the pump and motor still operating, the pump merely maintains the supply line full of gasoline under pressure, and the motor runs under minimum load, drawing a minimum amount of energy.

The mechanism shown in the drawings and described above is substantially that used in one of a number of actual service station installations, where the system is in successful commercial operation. It is highly effective in operation, and shows none of the difficulties normally encountered under similar conditions with the usual suction system heretofore in general use.

We claim:

1. Liquid-fuel dispensing apparatus, comprising an impeller pump adapted to be submerged in a liquid supply, a motor operatively connected to drive said pump, a plurality of dispensing stands each comprising a dispensing line terminating with a manually-controlled valved dispensing nozzle and each having means for energizing said motor, conduits connecting said pump to said plurality of stands and adapted to transmit pump discharge pressure to said plurality of stands when any of them is activated to energize said motor, means at each stand normally closing its line against flow and transmission of pressure through such line from its connecting conduit, manually operable means at each stand for initially equalizing pressure across the closing means thereof when the stand is activated for a dispensing operation, and subsequently operable means to open said closing means to pass dispensing flow through the line of the operated stand.

2. Liquid-fuel dispensing apparatus as set forth in claim 1 in which said subsequently operable means opens said closing means in response to a pressure decreased downstream from said closing means.

3. Liquid-fuel dispensing apparatus, comprising an impeller pump adapted to be submerged in a liquid supply, a motor operatively connected to drive said pump, a plurality of dispensing stands each comprising a dispensing line terminating with a manually-controlled valved dispensing nozzle and each having means for energizing said motor, conduits connecting said pump to said plurality of stands and adapted to transmit pump discharge pressure to said plurality of stands when any of them is activated to energize said motor, a normally-closed flow-blocking valve between the dispensing line of each stand and its connecting conduit, said valve being constructed and arranged to be biased closed by pressure differential thereacross from the connecting conduit to the line, manually operable means at each stand for initially equalizing pressure across the said valve of such stand when such stand is activated, and subsequently operable means to open said valve to pass dispensing flow.

4. Liquid-fuel dispensing apparatus, comprising an impeller pump adapted to be submerged in a liquid supply, a motor operatively connected to drive said pump, a plurality of dispensing stands each comprising a dispensing line terminating with a manually-controlled valved dispensing nozzle and each having means for energizing said motor, conduits connecting said pump to said plurality of stands and adapted to transmit pump discharge pressure to said plurality of stands when any of them is activated to energize said motor, a normally-closed flow-blocking valve between the dispensing line of each stand and its connecting conduit, said valve being constructed and arranged to close in the direction of flow from the connecting conduit to the line and to be biased closed by pressure differential thereacross from the connecting conduit to the line, a restricted by-pass across said valve from the connecting conduit to the line, a valve normally closing said by-pass, manually-operable means at each stand for opening said by-pass valve to equalize pressure across said flow-blocking valve upon initial activation of such stand, and subsequently operative means for opening said flow-blocking valve to pass dispensing flow.

5. Liquid-fuel dispensing apparatus as defined in claim 4 in which said subsequently operative means comprises a pressure motor responsive to pressure decrease downstream from said flow-blocking valve.

6. Liquid-fuel dispensing apparatus, comprising an impeller pump adapted to be submerged in a liquid supply, a motor operatively connected to drive said pump, a plurality of dispensing stands each comprising a dispensing line terminating with a manually-controlled valved dispensing nozzle and each having means for energizing said motor, conduits connecting said pump to said plurality of stands and adapted to transmit pump discharge pressure to said plurality of stands when any of them is activated to energize said motor, a main valve between the dispensing line of each stand and its connecting conduit, said main valve being constructed and arranged to close in the direction of flow from the connecting conduit to the line and to be biased closed by pressure differential across the valve from the connecting conduit to the line, a pressure motor for overcoming the valve-closing bias and opening said valve in response to reduced pressure in the line, and manually operable means controlling communication of pressure between the line and said motor.

7. Liquid-fuel dispensing apparatus, comprising an impeller pump adapted to be submerged in a liquid supply, a motor operatively connected to drive said pump, a plurality of dispensing stands each comprising a dispensing line terminating with a manually-controlled valved dispensing nozzle and each having means for energizing said motor, conduits connecting said pump to said plurality of stands and adapted to transmit pump discharge pressure to said plurality of stands when any of them is activated to energize said motor, a main valve between the dispensing line of each stand and its connecting conduit, said main valve being constructed and arranged to close in the direction of flow from the connecting conduit to the line and to be biased closed by pressure differential across the valve from the connecting conduit to the line, a pressure motor for overcoming said valve-closing bias and opening said valve and operable in response to pressure differential between said connecting conduit and said line, and manually operable means controlling communication of pressure to said motor.

8. Liquid-fuel dispensing apparatus, comprising an impeller pump adapted to be submerged in a liquid supply, a motor operatively connected to drive said pump, a plurality of dispensing stands each comprising a dispensing line terminating with a manually-controlled valved dispensing nozzle and each having means for energizing said motor, conduits connecting said pump to said plurality of stands and adapted to transmit pump discharge pressure to said plurality of stands when any of them is activated to energize said motor, and normally-closed variable restriction means between the dispensing line of each stand and its connecting conduit, said restricting means being responsive to pressure reduction in the line to open its restriction proportionately to the dispensing opening of said manually-controlled dispensing nozzle.

9. Liquid-fuel dispensing apparatus, comprising an impeller pump adapted to be submerged in a liquid supply, a motor operatively connected to drive said pump, a plurality of dispensing stands each comprising a dispensing line terminating with a manually-controlled valved dispensing nozzle and each having means for energizing said motor, conduits connecting said pump to said plurality of stands and adapted to transmit pump discharge pressure to said plurality of stands when any of them is activated to energize said motor, and normally-closed variable restriction means between the dispensing line of each stand and its connecting conduit, a restricted by-pass around said restriction means to pass limited flow from the conduit to the line, and control means responsive to pressure drop in said by-pass to open said restriction means proportionately to the dispensing opening of said manually-controlled dispensing nozzle.

10. Liquid-fuel dispensing apparatus, comprising an impeller pump adapted to be submerged in a liquid supply, a motor operatively connected to drive said pump, a plurality of dispensing stands each comprising a dispensing line terminating with a manually-controlled valved dispensing nozzle and each having means for energizing said motor, conduits connecting said pump to said plurality of stands and adapted to transmit pump discharge pressure to said plurality of stands when any of them is activated to energize said motor, flow-controlling means at each stand including a main valve in the dispensing line of the stand adjacent the inlet end thereof and a pressure-motor operatively connected to said main valve, said means being operative in response to inlet pressure to close said main valve and in response to reduced pressure to open said main valve, and manually operable means to connect said flow-controlling means selectively for response to inlet pressure and for response to pressure in the dispensing line of the stand.

11. Liquid-fuel dispensing apparatus, comprising an impeller pump adapted to be submerged in a liquid supply, a motor operatively connected to drive said pump, a plurality of dispensing stands each comprising a dispensing line terminating with a manually-controlled valved dispensing nozzle and each having means for energizing said motor, conduits connecting said pump to said plurality of stands and adapted to transmit pump discharge pressure to said plurality of stands when any of them is activated to energize said motor, a flow-control valve in the dispensing line of each stand adjacent the inlet end thereof, said valve being a check-type valve constructed and arranged to close with flow through the line from its connecting conduit, and pressure-responsive means operable to open said valve in response to pressure drop across the valve from the upstream side to the downstream side thereof, and manually-operable means normally inactivating said pressure-responsive means and operable to activate the same when the stand is actuated for a dispensing operation.

12. Liquid-fuel dispensing apparatus, comprising an impeller pump adapted to be submerged in a liquid supply, a motor operatively connected to drive said pump, a plurality of dispensing stands each comprising a dispensing line terminating with a manually-controlled valved dispensing nozzle and each having means for energizing said motor, conduits connecting said pump to said plurality of stands and adapted to transmit pump discharge pressure to said plurality of stands when any of them is activated to energize said motor, a valve in the dispensing line of each stand adjacent the inlet end thereof, said valve being biased to closed position to block flow through the line, a pressure motor for opening said valve against its bias, said motor being operable in response to pressure differential across the valve from the upstream to the downstream side thereof, means normally connecting said motor to pressure at only one side of the valve to render the motor inoperative to open said valve, and manually operable means to connect the motor to pressure at the other side of the valve to render the motor operative to open the valve.

References Cited in the file of this patent

UNITED STATES PATENTS

| | | |
|---|---|---|
| Re. 22,142 | Ungar | July 21, 1942 |
| 1,742,208 | Hawxhurst | Jan. 17, 1930 |
| 2,149,602 | Horvath | Mar. 7, 1939 |
| 2,352,958 | Lauer et al. | July 14, 1944 |
| 2,369,440 | Curtis | Feb. 13, 1945 |
| 2,507,597 | Holdridge | May 16, 1950 |
| 2,510,632 | Hemphill | June 6, 1950 |
| 2,612,843 | Gruetjen | Oct. 7, 1952 |
| 2,652,948 | Moore et al. | Sept. 22, 1953 |